(12) United States Patent
Goellnitz et al.

(10) Patent No.: US 9,993,830 B2
(45) Date of Patent: Jun. 12, 2018

(54) FOAM MOLDING SHELL FOR A CENTRIFUGE BOWL, CENTRIFUGE BOWL, METHOD FOR PRODUCING A THERMAL INSULATION ENCASING A BOWL OF A CENTRIFUGE AND CENTRIFUGE

(71) Applicants: Robert Goellnitz, Leipzig (DE); Heinz-Gernhard Koehn, Hamburg (DE); Thomas Nehrdich, Leipzig (DE)

(72) Inventors: Robert Goellnitz, Leipzig (DE); Heinz-Gernhard Koehn, Hamburg (DE); Thomas Nehrdich, Leipzig (DE)

(73) Assignee: Eppendorf AG, Hamburg (DE)

( * ) Notice: Subject to any disclaimer, the term of this patent is extended or adjusted under 35 U.S.C. 154(b) by 958 days.

(21) Appl. No.: 13/775,250

(22) Filed: Feb. 24, 2013

(65) Prior Publication Data

US 2013/0178352 A1  Jul. 11, 2013

Related U.S. Application Data

(63) Continuation of application No. PCT/EP2011/004409, filed on Sep. 1, 2011.

(30) Foreign Application Priority Data

Sep. 1, 2010  (DE) .................. 10 2010 036 106

(51) Int. Cl.
*B04B 7/08* (2006.01)
*B04B 7/02* (2006.01)
(Continued)

(52) U.S. Cl.
CPC .................. *B04B 7/08* (2013.01); *B04B 7/02* (2013.01); *B04B 15/02* (2013.01);
(Continued)

(58) Field of Classification Search
CPC .. B04B 7/02; B04B 7/08; B04B 15/02; B04B 15/08; B29C 44/00; B29C 44/1228; B29C 33/0016
(Continued)

(56) References Cited

U.S. PATENT DOCUMENTS 2,906,453 A * 9/1959 Driscoll .................... B04B 7/08
494/14
2,989,782 A * 6/1961 Barkhuff, Jr. ............. C08J 9/224
264/45.4
(Continued)

FOREIGN PATENT DOCUMENTS

DE        20114322 U1    7/2002
JP        2005230744 A   9/2005
(Continued)

*Primary Examiner* — Walter D Griffin
*Assistant Examiner* — Shuyui S Liu
(74) *Attorney, Agent, or Firm* — Von Rohrscheidt Patents (57) ABSTRACT

A foam molding shell for a centrifuge bowl, a bowl for a centrifuge, a method for producing a thermal insulation encasing the bowl for the centrifuge and to a centrifuge. The foam molding shell is configured as a disposable tool for foam encasing the bowl for the centrifuge with the thermal insulating material. Thus, the production complexity and the production cost of the centrifuge bowl with the thermally insulated bowl for the centrifuge can be significantly reduced.

16 Claims, 8 Drawing Sheets

(51) Int. Cl.
*B04B 15/02* (2006.01)
*B29C 33/00* (2006.01)
*B29C 44/12* (2006.01)
*B29C 44/00* (2006.01)

(52) U.S. Cl.
CPC .......... *B29C 33/0016* (2013.01); *B29C 44/00* (2013.01); *B29C 44/1228* (2013.01)

(58) Field of Classification Search
USPC ..................................... 494/60, 81; 264/46.4
See application file for complete search history.

(56) References Cited

U.S. PATENT DOCUMENTS

| 3,463,388 | A | * | 8/1969 | Salmon | ..................... | B04B 7/08 |
| | | | | | | 494/38 |
| 3,860,166 | A | * | 1/1975 | Anderson | .............. | G01N 5/045 |
| | | | | | | 494/10 |
| 5,094,608 | A | * | 3/1992 | Piazza | ..................... | B29C 33/26 |
| | | | | | | 249/170 |
| 2005/0233884 | A1 | * | 10/2005 | Hayasaka | ................. | B04B 7/06 |
| | | | | | | 494/60 |

FOREIGN PATENT DOCUMENTS

JP        2007 044586 A     2/2007
JP        2007044586 A * 2/2007

\* cited by examiner

FIG. 1a

PRIOR ART

FIG. 1b

PRIOR ART

FOAM MOLDING SHELL FOR A CENTRIFUGE BOWL, CENTRIFUGE BOWL, METHOD FOR PRODUCING A THERMAL INSULATION ENCASING A BOWL OF A CENTRIFUGE AND CENTRIFUGE

RELATED APPLICATIONS

This application is a continuation of International application PCT/EP2011/004409 filed on Sep. 1, 2011 claiming priority from German application DE 10 2010 036 106.2 filed on Sep. 1, 2010. All the above applications are incorporated in their entirety by this reference.

BACKGROUND OF THE INVENTION

In centrifuges, in particular in lab centrifuges, the materials to be centrifuged are temperature controlled through heating or cooling. Therefore it is provided in particular that the bowl of the centrifuge is encased by a thermal insulation. Typically the bowl is encased by an active temperature control element, for example a tube winding which is then encased by the thermal insulating material.

Figure 1A:
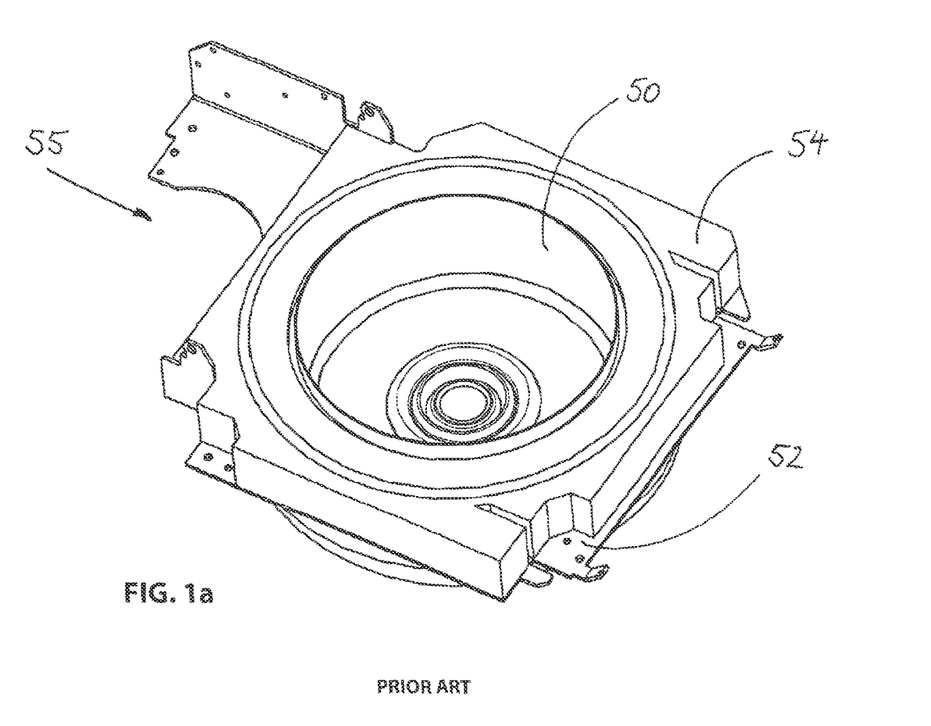
FIG. 1a illustrates a known centrifuge bowl in two different views.
Figure 1B:
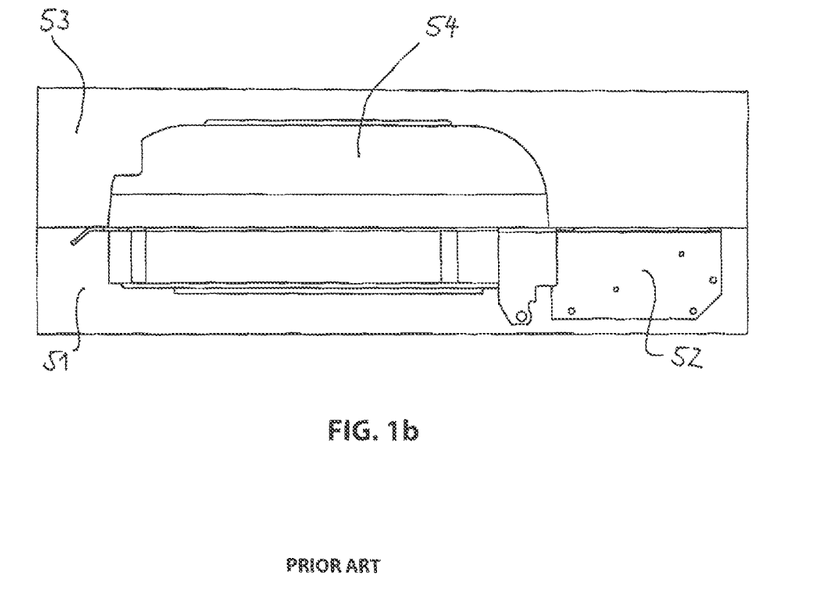

According to a known art production method which is illustrated in FIGS. 1a-1b the bowl 50 is placed onto a lower foam mold, typically an intermediary plate 52 is placed thereon, wherein the intermediary plate is used for attaching the foamed in bowl in the centrifuge housing (not shown) and an upper foam mold 53 is arranged. Subsequently the foam components are injected, wherein the portions of the lower foam mold 51 and the upper foam mold 53 which come in contact with the foam components are coated with a release agent before the foam components are injected. After hardening of the foam casing 54 and opening the tool 51, 53 the centrifuge bowl 55 formed by the foam covered bowl 50 can be removed.

It is a disadvantage of this production process that a complex preparation of the tool 51, 53 through applying release agent and also a complex subsequent work through cleaning the tool 51, 53 from foam residue and contaminated release agent residues is required.

BRIEF SUMMARY OF THE INVENTION

Thus it is an object of the present invention to provide a method for producing a centrifuge bowl with a thermally insulated bowl, wherein the method is less complex and thus more cost effective.

The present invention relates to a foam molding shell for a bowl for a centrifuge, the foam molding shell including a base; a wall portion; and an opening arranged opposite to the base for receiving a bowl for a centrifuge, wherein the opening interacts with a second mold half so that an interspace between the foam molding shell and the bowl is fillable with a foam, and wherein the foam molding shell is a disposable tool for encasing the bowl with the foam and remains at the bowl encased with the foam to form a centrifuge bowl.

The invention also relates to a centrifuge bowl for a centrifuge, the centrifuge bowl including a bowl; a thermal insulation for the bowl; and/or a temperature control element encasing the bowl, wherein the centrifuge bowl includes a foam molding shell as described supra and the thermal insulation is arranged between the bowl and the foam molding shell.

The invention also relates to a method for producing a thermal insulation encasing a bowl for a centrifuge including the steps arranging a bowl with an upper bowl opening on a lower foam mold; arranging an upper foam mold on the lower foam mold so that the bowl is arranged between the lower foam mold and the upper foam mold; foam encasing the bowl with a thermal insulating material which includes polyurethane; and separating the lower foam mold from the foam encased bowl, wherein the upper foam mold is configured as a disposable tool which is not separated from the thermal insulation after foam encasing the bowl to form a centrifuge bowl.

The invention also relates to a centrifuge including a centrifuge housing; a rotor; a centrifuge motor for driving the rotor; and a bowl in which the rotor runs, wherein a centrifuge bowl is provided, wherein the foam molding shell includes stands for arranging the foam molding shell in the centrifuge housing, and wherein damping elements are arranged between the stands and the centrifuge housing.

Additionally a suitable tool for producing the centrifuge bowl shall also be provided and a centrifuge bowl and a centrifuge shall be provided whose production is less complex and thus more cost effective.

The foam molding shell according to the invention for a bowl of a centrifuge includes a base, a wall portion and a opening arranged opposite to the base for receiving the bowl, wherein the opening is configured to interact with a second mold half so that the interspace between the foam molding shell and the bowl can be filled with foam and is characterized in that the foam molding shell can be used as a disposable tool for encasing the bowl with foam and to subsequently remain at the foam encased bowl for forming the centrifuge bowl. A cut out can be advantageously provided in the base of the foam molding shell for a drive shaft of a centrifuge motor.

This means that when producing the centrifuge bowl the foam molding shell itself which is used during foam encasing does not have to be provided with release agent and no subsequent work has to be performed either, because the foam molding shell is configured as a disposable tool which remains at the foamed in bowl.

Furthermore, the foaming tool can be configured much less complex with the result that smaller tool dimensions are achieved.

Furthermore operating the foam forming tool is significantly simplified. Besides the significant release agent reduction the manufacturing time can also be reduced significantly, namely by up to 25% over the conventional manufacturing method.

In an advantageous embodiment mounting elements are provided at the foam molding shell for arranging the foam molding shell in a centrifuge housing, wherein advantageously the mounting elements are configured as stands protruding from the foam molding shell and/or for attaching an intermediary plate provided for arranging the foam molding shell in the centrifuge housing. Due to these mounting elements the foaming process is further simplified since no mounting elements like intermediary plates or similar have to be integrally foamed in, but these elements are directly arranged at the foam molding shell.

In an advantageous embodiment, the stands are hollow and in particular configured with a recess whereby the foam molding shell is light and cost effective. Furthermore the stands can thus be used at the same time as venting spouts for the foaming process.

It is particular advantageous when the foam molding shell is formed from plastic material, advantageously a thermal plastic material, in particular acrylnitril-butadien-styrol or recycled acrylnitril-butadien-styrol (ABS). In particular using recycled acrylnitril-butadien-styrol (ABS) has the advantage that the testing complexity is much lower since there are no special quality requirements. Furthermore this material can be used in any color since the foam molding shell is arranged in the interior of the centrifuge housing and thus not visible. This facilitates a very cost effective production for the foam molding shell.

The invention also relates to a centrifuge bowl for a centrifuge with a bowl and a thermal insulation for the bowl itself and/or a tempering element encasing the bowl, wherein the centrifuge bowl includes the foam molding shell according to the present invention and the thermal insulation is arranged between the bowl and the foam molding shell. A centrifuge bowl of this type can be used, for example, as accessory or spare part for centrifuges.

It can be advantageously provided that the foam molding shell includes at least one support element in the cut out, advantageously a rubber jacket for supporting the shaft of the centrifuge motor, wherein the support element reaches in particular over a support opening in the bowl and over the cut out. This support element advantageously dampens vibrations of the centrifuge motor. Furthermore the support element can also be simultaneously used as a protection for the centrifuge motor and the interior of the centrifuge against liquids and similar introduced into the bowl.

The centrifuge bowl advantageously includes an intermediary plate for arranging the centrifuge bowl in a centrifuge housing, wherein the intermediary plate is attached at the foam molding shell. Thus, the centrifuge bowl can be attached at the centrifuge housing in a very stable manner. Alternatively or additionally, however stands can also be provided at the foam molding shell of the centrifuge bowl, wherein the stands can then be connected with the centrifuge housing, for example, bolted together. Also this provides a very secure attachment of the centrifuge bowl in the centrifuge housing.

The invention also relates to method for producing a thermal insulation encasing the bowl of a centrifuge including the following steps:

arranging the bowl with an upper bowl opening on a lower foam mold;

arranging an upper foam mold on the lower foam mold so that the bowl is arranged between the lower and the upper foam molds;

foam encasing the bowl with a thermal insulating material which preferably includes polyurethane (PUR); and separating the lower foam mold from the foam encased bowl, wherein the upper foam mold is configured as disposable tooling which is not separated from the thermal insulation after foam encasing the bowl, which forms a centrifuge bowl, wherein the upper foam mold is advantageously configured as the foam molding shell according to the invention.

As recited supra this method facilitates a significant reduction of production time which leads to a much more economical production method for the centrifuge.

In a particular advantageous manner the portion of the upper foam mold which is filled with foam is not provided with release agent. Thus, the release agent use can be significantly reduced and furthermore a secure interconnection between thermal insulation and foam molding shell is provided.

The invention also relates to a centrifuge, in particular a lab centrifuge which includes a centrifuge housing, a rotor, a centrifuge motor for driving the rotor and a bowl in which the rotor runs, wherein the bowl is provided as a centrifuge bowl according to the present invention. Advantageously the foam molding shell includes stands for arranging the foam molding shell in the centrifuge housing, wherein in particular damping elements are provided between the stands on the centrifuge housing.

BRIEF DESCRIPTION OF THE DRAWINGS

The features of the present invention and additional advantages are now described with reference to a description of an exemplary embodiment with reference to drawing figures wherein:

FIG. 1b illustrates the method for producing the centrifuge bowl according to FIG. 1a;

DETAILED DESCRIPTION

Figure 2A:
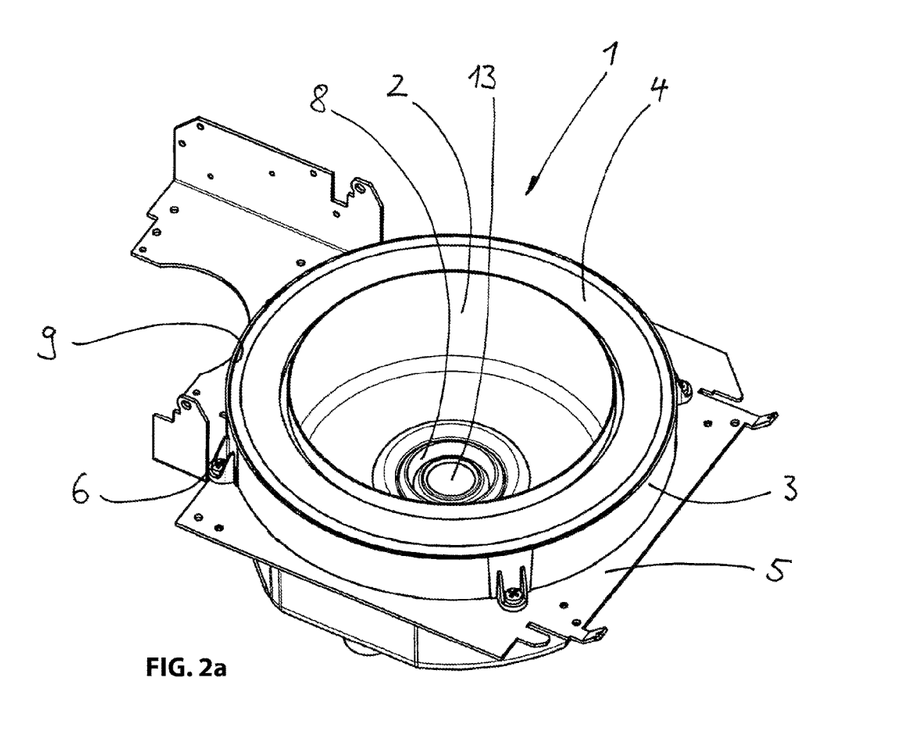
FIGS. 2a-2c illustrate a first exemplary embodiment of the centrifuge bowl according to the invention in three different views.
Figure 2B:
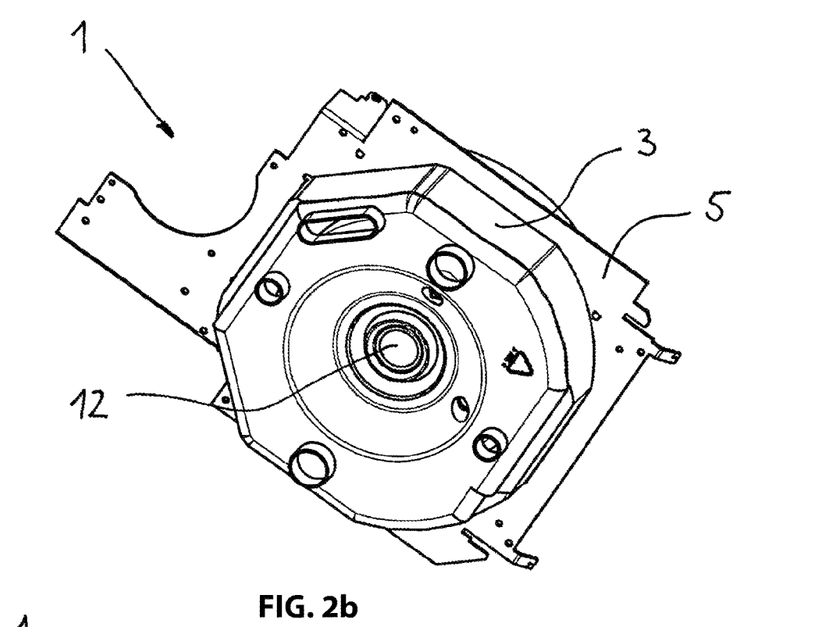
Figure 2C:
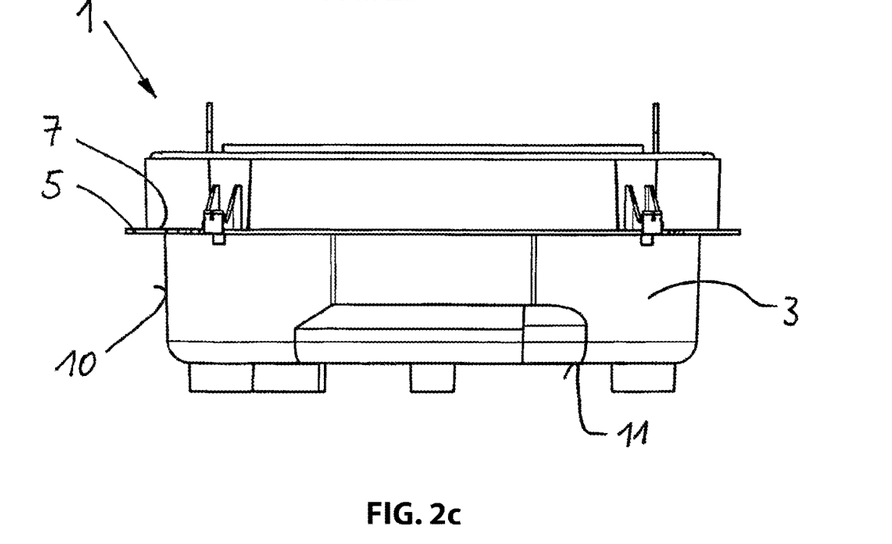

FIGS. 2a-2c illustrate a centrifuge bowl 1 in a first exemplary embodiment, thus in FIG. 2a in a perspective view from above, in FIG. 2b in a side view and in FIG. 2c in a perspective view from below.

The centrifuge bowl 1 includes a bowl 2, a foam molding shell 3, thermal insulation 4 and an intermediary plate 5. It is furthermore visible that the intermediary plate 5 is fixated at the foam molding shell 3 through threaded connections 6. At the same time the intermediary plate 5 includes an interior diameter which approximately corresponds to the exterior diameter of the foam molding shell 3, wherein the intermediary plate 5 is supported at a protrusion 7 of the foam molding shell 3.

Furthermore a rubber jacket 8 for supporting the shaft of a centrifuge motor (not illustrated) is provided. The foam molding shell 3 includes an opening 9, a wall portion 10 and a base 11. The rubber jacket 8 reaches over the cut out 12 in the base 11 of the foam molding shell 3 and also over the opening 13 in the bowl 2.

Figure 3:
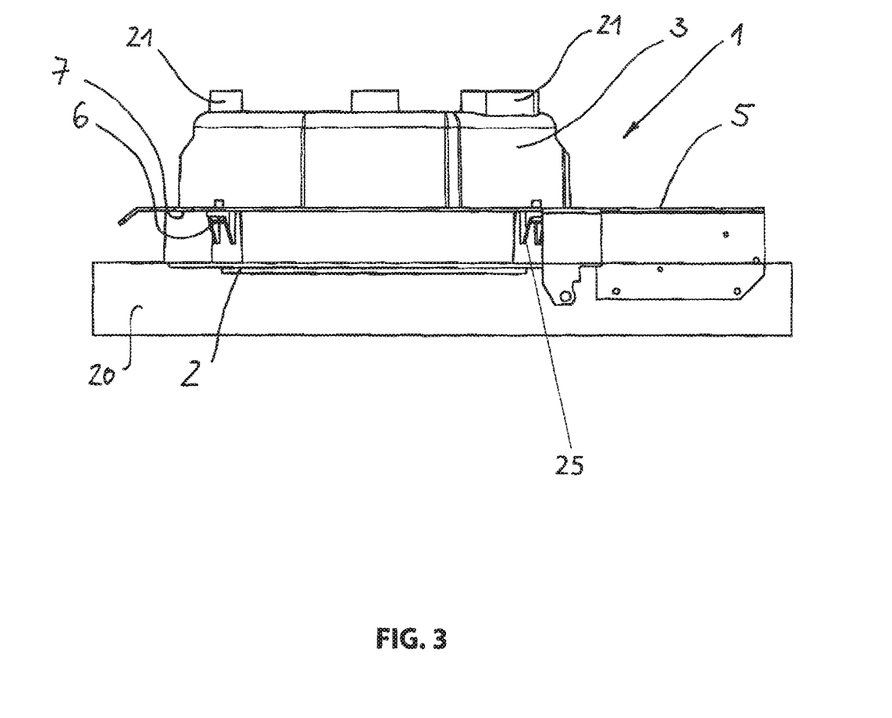
FIG. 3 illustrates the method according to the present invention for producing the centrifuge bowl according to FIGS. 2a, 2b.

FIG. 3 schematically illustrates the method according to the present invention for foam encasing the bowl 2 in order to form the centrifuge bowl 1. For that purpose, the bowl 2 is placed on a lower foam mold 20 which is only schematically illustrated and the foam molding shell 3 is arranged on the lower foam mold 20 so that the bowl 2 is arranged between the lower foam mold 20 and the foam molding shell 3. Grooves or similar are advantageously provided in the lower foam mold 20 for precise alignment, wherein the bowl 2 and the foam molding shell 3 are respectively adjusted.

The intermediary plate 5 was attached in advance at the foam molding shell 3 by placing it on the shoulder 7 and fixating it with a threaded connection 6. Stands 25 that provide the threaded connection 6 are provided at the foam molding shell and protrude from an outside of the foam molding shell in a radial direction at a position that is substantiate central with respect to an axial extension of the foam molding shell and proximal to the shoulder 7.

The lower foam mold 20 includes a surface that is configured so that a sealing of the foam molding shell 3 and also of the bowl 2 is provided. Furthermore the lower foam mold 20 includes inlets (not illustrated) for the material to be foamed in, wherein the inlets are arranged in a portion between the bowl 2 and the wall portion 10 of the foam molding shell 3. This provides that the material to be foamed in can only enter into the interspace between the bowl 2 and the foam molding shell 3.

It can be provided for better sealing that the lower foam mold 20 and the foam molding shell 3 are pressed onto one another. Alternatively or additionally also an activatable seal element, for example, an inflatable rubber seal and similar can be provided between the lower foam mold 20 and the foam molding shell 3, which facilitates very precise sealing.

The foam molding shell 3 includes venting spouts 21 from which air from the intermediary portion between the bowl 2 and the foam molding shell 3 can exit when the material is foamed in. The foaming process is typically completed when the ventilation spouts 21 are completely filled with the foamed in material. Then there is a sufficient material reserve in order to compensate a shrinking of the foamed in material during hardening.

Figure 4A:
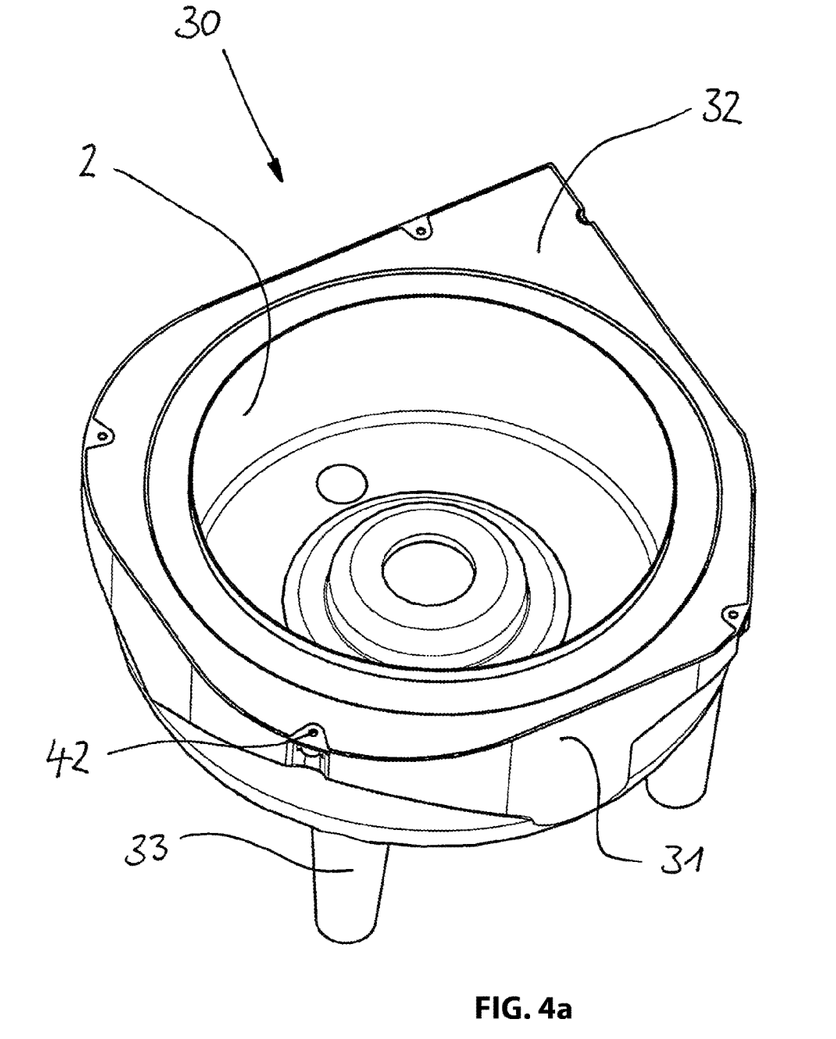
FIGS. 4a, 4b illustrate a second exemplary embodiment of the centrifuge bowl according to the present invention in two different views.
Figure 4B:
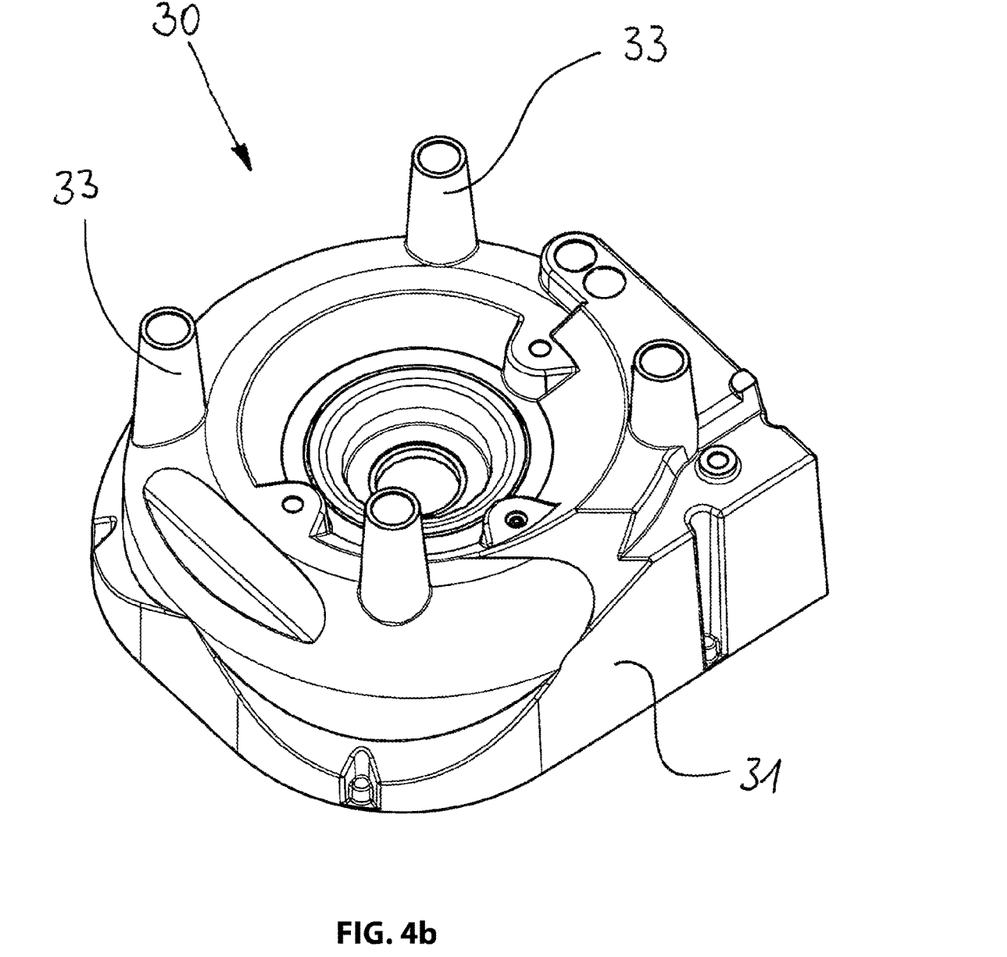

FIGS. 4a, b illustrates a second exemplary embodiment of the centrifuge bowl 30 according to the present invention with the foam molding shell 31 in two perspective views. It is illustrated in turn that the centrifuge bowl 30 includes a bowl 2 wherein a thermally insulating material 32 was foamed in between the bowl 2 and the foam molding shell 31.

Differently from the centrifuge bowl 1 according to the first exemplary embodiment the centrifuge bowl 30 neither includes an intermediary plate 5 nor the protrusion 7. Instead, however, stands 33 that are hollow inside are provided which are also simultaneously used as ventilation spouts for the foaming method.

Figure 5:
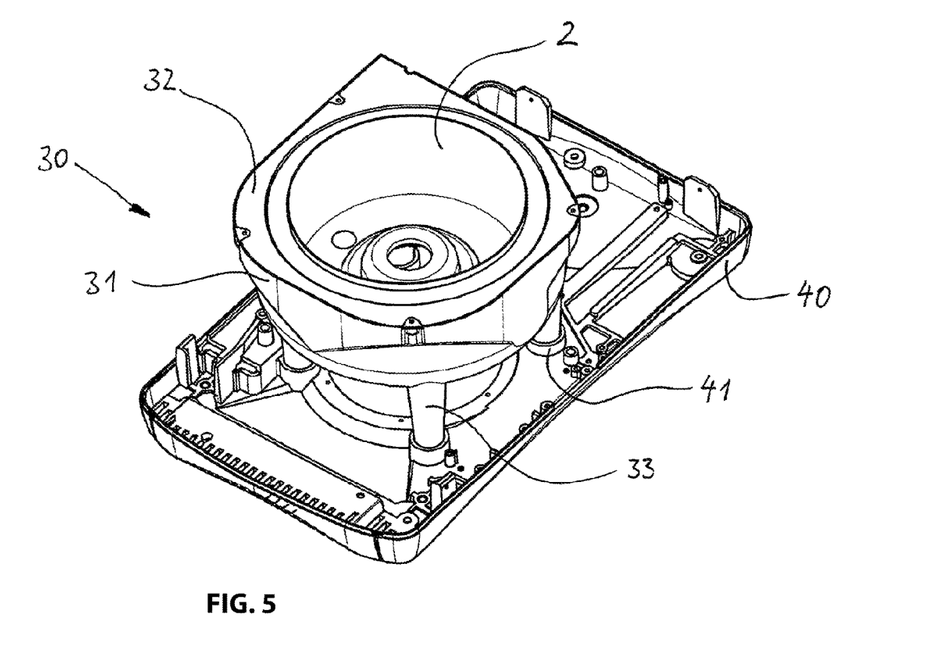
FIG. 5 illustrates a perspective view of the centrifuge bowl according to FIG. 4a, 4b which is arranged in a portion of centrifuge housing.

FIG. 5 eventually illustrates a perspective view of a connection between the centrifuge bowl 30 and a base 40 of a centrifuge housing that is not illustrated in more detail.

It is illustrated that the stands 33 are inserted in corresponding receivers 41. Thus, the centrifuge bowl 30 is secured against lateral movements. On the centrifuge bowl 30 an upper covering (not illustrated) of the centrifuge housing is attached through the attachment elements 42, wherein the cover is then connected with the lower base 40 of the centrifuge housing possibly through intermediary elements. Thus, the centrifuge bowl is also secured against vertical movements with respect to the receivers 41.

The stands 33 can also be alternatively glued into the receivers 41 or a threaded connection can be provided, wherein the bottom side openings of the stands 33 can, for example, include respective receivers for a threaded connection.

It is evident that the present invention yields substantial advantages. On the one hand side the foam molding shell 3, 31 according to the present invention is a disposable tool which does not have to be provided with release agent for the foam encasing process any more since it is not removed from the thermal insulation 4, 32 after foaming but jointly forms the centrifuge bowl 1, 30 according to the present invention. On the other hand side any finishing at the disposable tool 3, 31 which would be otherwise required for removing foam residuals or contaminated release agent residuals can be omitted.

Overall this helps to reduce the manufacturing time by up to 25% over the conventional method according to FIG. 1a-1b and additionally the entire release agent requirement is greatly reduced since release agent is only required for the lower foam mold 20 which, however, has comparatively little contact with the thermal insulation 4, 32.

Furthermore using the disposable tool helps to significantly reduce the complexity of the foaming tool because the disposable tool 3, 31 is part of the centrifuge bowl 1, 30 and thus the deforming process does not have to be considered. Furthermore the disposable tool 3, 31 facilitates implementing much smaller tooling dimensions so that operating the foaming tool is significantly simplified so that the production process becomes much more cost effective.

Using thermal plastic materials, for example, (ABS) or even recycled (ABS) helps to further reduce costs since the foam molding shell 3, 31 can be produced in a very cost effective manner wherein as a matter of principle any qualities and colors can be used.

When additional stands 33 are applied to the foam molding shell 30, then the function of the disposable tool as a forming tool is advantageously combined with the support and retaining function, wherein the stands 33 are used for attachment and also for venting during the production process. Alternatively it can also be provided to provide separate ventilation spouts independently from the stands 33.

It is also appreciated that by omitting a subsequent cleaning step of the foam molding shell 3, 31 in this regard also no detergents are caused that may be environmentally hazardous.

Furthermore also additional attachment devices like, for example, support nipples (not illustrated) can be arranged at the foam molding shell 3, 31 besides the attachment elements 6, 33, 42, wherein the attachment elements are used for attaching the centrifuge bowl 1, 30 within a centrifuge housing in order to arrange power supply cables, information cables and similar which are required for operating the centrifuge (not illustrated).

Thus overall it is appreciated that the present invention reduces very clearly the production complexity and the production costs of the centrifuge bowl 1, 30 with a thermally insulated bowl 2.

What is claimed is:

1. A foam molding shell for a rotation symmetrical bowl for a centrifuge, the foam molding shell comprising:
   a base;
   a wall portion; and
   an opening arranged opposite to the base and receiving the rotation symmetrical bowl for the centrifuge,
   wherein the rotation symmetrical bowl for the centrifuge is arranged inside the foam molding shell,
   wherein an interspace between the foam molding shell and the rotation symmetrical bowl for the centrifuge is filled with a foam so that the foam is in contact with the foam molding shell and the rotation symmetrical bowl for the centrifuge,
   wherein the foam molding shell forms a centrifuge bowl together with the rotation symmetrical bowl for the centrifuge encased with the foam,
   wherein stands are provided at a radial outside of the foam molding shell that protrude from the foam molding shell at a position that is substantially central with respect to an axial extension of the foam molding shell along a rotation axis of the centrifuge,
   wherein the foam molding shell includes ventilation spouts filled with the foam,
   wherein the stands are hollow, wherein the stands are configured to arrange the centrifuge bowl in a centrifuge housing, wherein the stands protrude from the foam molding shell in a radial direction, and wherein the stands attach an intermediary plate configured to arrange the foam molding shell in the centrifuge housing.

2. The foam molding shell according to claim 1, wherein a cut out is provided in the base of the foam molding shell for receiving a shaft of a centrifuge motor.

3. The foam molding shell according to claim 1, wherein the stands include a recess.

4. The foam molding shell according to claim 1, wherein the foam molding shell is formed from a plastic material.

5. The foam molding shell according to claim 4, wherein the foam molding shell is formed from a thermoplastic plastic material.

6. A centrifuge bowl for a centrifuge, the centrifuge bowl comprising:

a rotation symmetrical bowl for the centrifuge; and a thermal insulation for the rotation symmetrical bowl for the centrifuge and for a temperature control element, the thermal insulation encasing the rotation symmetrical bowl for the centrifuge, wherein the centrifuge bowl includes a foam molding shell including:

a base;

a wall portion; and an opening arranged opposite to the base and receiving the rotation symmetrical bowl for the centrifuge, wherein the rotation symmetrical bowl for the centrifuge is arranged inside the foam molding shell, wherein an interspace between the foam molding shell and the rotation symmetrical bowl for the centrifuge is filled with a foam so that the foam is in contact with the foam molding shell and the rotation symmetrical bowl for the centrifuge, wherein the foam molding shell forms a centrifuge bowl together with the rotation symmetrical bowl for the centrifuge encased with the foam, wherein stands are provided at a radial outside of the foam molding shell that protrude from the foam molding shell at a position that is substantially central with respect to an axial extension of the foam molding shell along a rotation axis of the centrifuge, wherein the foam molding shell includes ventilation spouts filled with the foam, wherein the stands are hollow, wherein the stands are configured to arrange the centrifuge bowl in a centrifuge housing, wherein the stands protrude from the foam molding shell in a radial direction, and wherein the stands attach an intermediary plate configured to arrange the foam molding shell in the centrifuge housing.

7. The centrifuge bowl according to claim 6, wherein a cut out is provided in the base of the foam molding shell for receiving a shaft of a centrifuge motor, wherein the foam molding shell includes at least one support element in the cut out, and wherein the at least one support element supports the shaft of the centrifuge motor.

8. The centrifuge bowl according to claim 7, wherein the at least one support element reaches over a support opening in the bowl and over the cut out, or wherein the support element is a rubber jacket.

9. The foam molding shell according to claim 5, wherein the thermoplastic plastic material is acrylnitril-butadien-styrol or recycled acrylnitril-butadien-styrol.

10. The centrifuge bowl according to claim 7, wherein the at least one support element reaches over a support opening in the bowl and over the cut out, and wherein the support element is a rubber jacket.

11. The foam molding shell according to claim 1, wherein the stands are provided at a shoulder of the foam molding shell.

12. The centrifuge bowl according to claim 6, wherein the stands are provided at a shoulder of the foam molding shell.

13. The foam molding shell according to claim 1, wherein the stands are filled with the foam.

14. The centrifuge bowl according to claim 6, wherein the stands are filled with the foam.

15. A foam molding shell for a rotation symmetrical bowl for a centrifuge, the foam molding shell comprising:

a base;

a wall portion; and an opening arranged opposite to the base and receiving the rotation symmetrical bowl for the centrifuge, wherein the rotation symmetrical bowl for the centrifuge is arranged inside the foam molding shell, wherein an interspace between the foam molding shell and the rotation symmetrical bowl for the centrifuge is filled with a foam so that the foam is in contact with the foam molding shell and the rotation symmetrical bowl for the centrifuge, wherein the foam molding shell forms a centrifuge bowl together with the rotation symmetrical bowl for the centrifuge encased with the foam, wherein stands are provided at a radial outside of the foam molding shell that protrude from the foam molding shell at a position that is substantially central with respect to an axial extension of the foam molding shell along a rotation axis of the centrifuge, wherein the stands are hollow and form ventilation spouts for the foam molding shell, wherein the stands are configured to arrange the centrifuge bowl in a centrifuge housing, wherein the stands protrude from the foam molding shell in a radial direction, and wherein the stands attach an intermediary plate configured to arrange the foam molding shell in the centrifuge housing.

16. A centrifuge bowl for a centrifuge, the centrifuge bowl comprising:

a rotation symmetrical bowl for the centrifuge; and a thermal insulation for the rotation symmetrical bowl for the centrifuge and for a temperature control element, the thermal insulation encasing the rotation symmetrical bowl for the centrifuge, wherein the centrifuge bowl includes a foam molding shell including:

a base;

a wall portion; and an opening arranged opposite to the base and receiving the rotation symmetrical bowl for the centrifuge, wherein the rotation symmetrical bowl for the centrifuge is arranged inside the foam molding shell, wherein an interspace between the foam molding shell and the rotation symmetrical bowl for the centrifuge is filled with a foam so that the foam is in contact with the foam molding shell and the rotation symmetrical bowl for the centrifuge, wherein the foam molding shell forms a centrifuge bowl together with the rotation symmetrical bowl for the centrifuge encased with the foam, wherein stands are provided at a radial outside of the foam molding shell that protrude from the foam molding shell at a position that is substantially central with respect to an axial extension of the foam molding shell along a rotation axis of the centrifuge, wherein the stands are hollow and form ventilation spouts for the foam molding shell, wherein the stands are configured to arrange the centrifuge bowl in a centrifuge housing, wherein the stands protrude from the foam molding shell in a radial direction, and wherein the stands attach an intermediary plate configured to arrange the foam molding shell in the centrifuge housing.

\* \* \* \* \*